(12) United States Patent
Lester et al.

(10) Patent No.: US 7,199,894 B2
(45) Date of Patent: Apr. 3, 2007

(54) PROVIDING INFORMATION TO PRINTING DEVICES FOR FACILITATING PRINTING

(75) Inventors: Samuel M. Lester, Boise, ID (US); Jimmy Sfaelos, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 889 days.

(21) Appl. No.: 10/282,681

(22) Filed: Oct. 29, 2002

(65) Prior Publication Data
US 2004/0080766 A1  Apr. 29, 2004

(51) Int. Cl.
G06F 15/00 (2006.01)
G06F 15/16 (2006.01)
(52) U.S. Cl. ...................... 358/1.15; 709/203
(58) Field of Classification Search ............... 358/1.15, 358/1.14, 1.11, 468; 709/200, 203, 222; 707/104.1, 101; 718/102, 104, 100
See application file for complete search history.

(56) References Cited

U.S. PATENT DOCUMENTS

| 6,388,757 | B1* | 5/2002 | Koga | 358/1.11 |
| 2003/0160819 | A1* | 8/2003 | Chase | 345/744 |
| 2003/0174135 | A1* | 9/2003 | Gyllenskog et al. | 345/471 |

* cited by examiner

*Primary Examiner*—King Y. Poon
*Assistant Examiner*—Saeid Ebrahimi

(57) ABSTRACT

Methods for printing are provided. A representative method for printing includes enabling information corresponding to a print task to be evaluated, and, if it is determined that a printing device to which the print task is directed is unable to process the print task without performing a font substitution, enabling additional information to be acquired. By using the additional information, the printing device is able to process the print task without performing a font substitution. Systems and other methods also are provided.

17 Claims, 6 Drawing Sheets

PROVIDING INFORMATION TO PRINTING DEVICES FOR FACILITATING PRINTING

BACKGROUND OF THE INVENTION

1. Field of the Invention

The present invention generally relates to printing. More specifically, the present invention relates to systems and methods that involve providing information to a printing device so that the printing device can facilitate printing of a print task.

2. Description of the Related Art

In the past, bitmapped fonts were the primary fonts used for printing. However, bitmapped fonts typically exhibit the undesirable attribute of having jagged edges. This is particularly the case when the size of the font is changed or scaled from the size at which it was designed to be printed. More recently, fonts are being used that are based on vector graphics. Unlike the aforementioned bitmapped fonts, vector fonts typically can be scaled, i.e., enlarged and/or reduced, without exhibiting jagged edges.

Typically, fonts, i.e., a font set and its associated algorithms, are licensed for use by one printing device. Therefore, when that printing device requires the use of a particular licensed font, the printing device accesses the font set so that raster bits corresponding to the desired font raster bits can be produced.

If a user desires to print a particular font using a printing device that does not have access to the font set, a page description language (PDL) associated with the printing device typically will perform a font substitution. In particular, the PDL can enable another font, e.g., a font that possesses similar characteristics to the unavailable font, to be printed in place of the requested font. Problematically, however, a font substitution operation typically does not provide a document with printed information that directly corresponds to the image that a user intended to print.

Based on the foregoing, it should be appreciated that there is a need for improved systems and methods that address the aforementioned and/or other shortcomings of the prior art.

SUMMARY OF THE INVENTION

The present invention relates to systems and methods that involve providing information to a printing device so that the printing device can facilitate printing of a print task. In this regard, a representative embodiment of a method for printing includes enabling information corresponding to a print task to be evaluated, and, if it is determined that a printing device to which the print task is directed is unable to process the print task without performing a font substitution, enabling additional information to be acquired. By using the additional information, the printing device is able to process the print task without performing a font substitution.

A representative embodiment of a print system includes a print information system that is configured to evaluate information corresponding to a print task. The print information system also is configured to acquire additional information so that, if it is determined that a printing device to which the print task is directed is unable to process the print task without performing a font substitution, the print information system enables the additional information to be acquired. In this manner, the printing device, by using the additional information, is enabled to process the print task without performing a font substitution.

Another embodiment of a print system incorporates means for enabling information corresponding to a print task to be evaluated, and means for enabling additional information to be acquired. Therefore, if it is determined that a printing device to which the print task is directed is unable to process the print task without performing a font substitution, the printing device is able to process the print task without performing a font substitution by using the additional information.

Print information systems stored on a computer-readable media also are provided. In this regard, a representative embodiment of a print information system includes logic configured to evaluate information corresponding to a print task, and logic configured to acquire additional information. So provided, if it is determined that a printing device to which the print task is directed is unable to process the print task without performing a font substitution, the print information system enables the additional information to be acquired. Thereafter, the printing device is able to process the print task without performing a font substitution by using the additional information.

Another embodiment of a print information system, which can be stored on a computer-readable medium, includes logic configured to receive a request for additional information, the additional information being adapted to enable a printing device to process a print task without performing a font substitution, and logic configured to provide the additional information in response to the request.

Still another embodiment of a print information system includes logic configured to determine whether a printing device to which a print task is directed is able to process the print task without performing a font substitution, logic configured to determine the location of additional information for enabling the printing device to process the print task without performing a font substitution, and logic configured to enable the additional information to be provided to the printing device.

BRIEF DESCRIPTION OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION

As will be described in greater detail herein, print system and methods of the present invention can potentially alleviate some of the difficulties associated with printing from a networked printer. In particular, embodiments of the invention may be adapted to enable information to be provided to or shared with a printing device so that the printing device is capable of printing one or more fonts, i.e., one or more fonts that the printing device would not, otherwise, have been able to print. For instance, a device of a network may have access to the font set associated with the font that the printing device has been instructed to print. Typically, the device would provide information corresponding to the font to the printing device so that the font can be rendered by the printing device. In some embodiments, the device providing the information may be another printing device.

Figure 1:
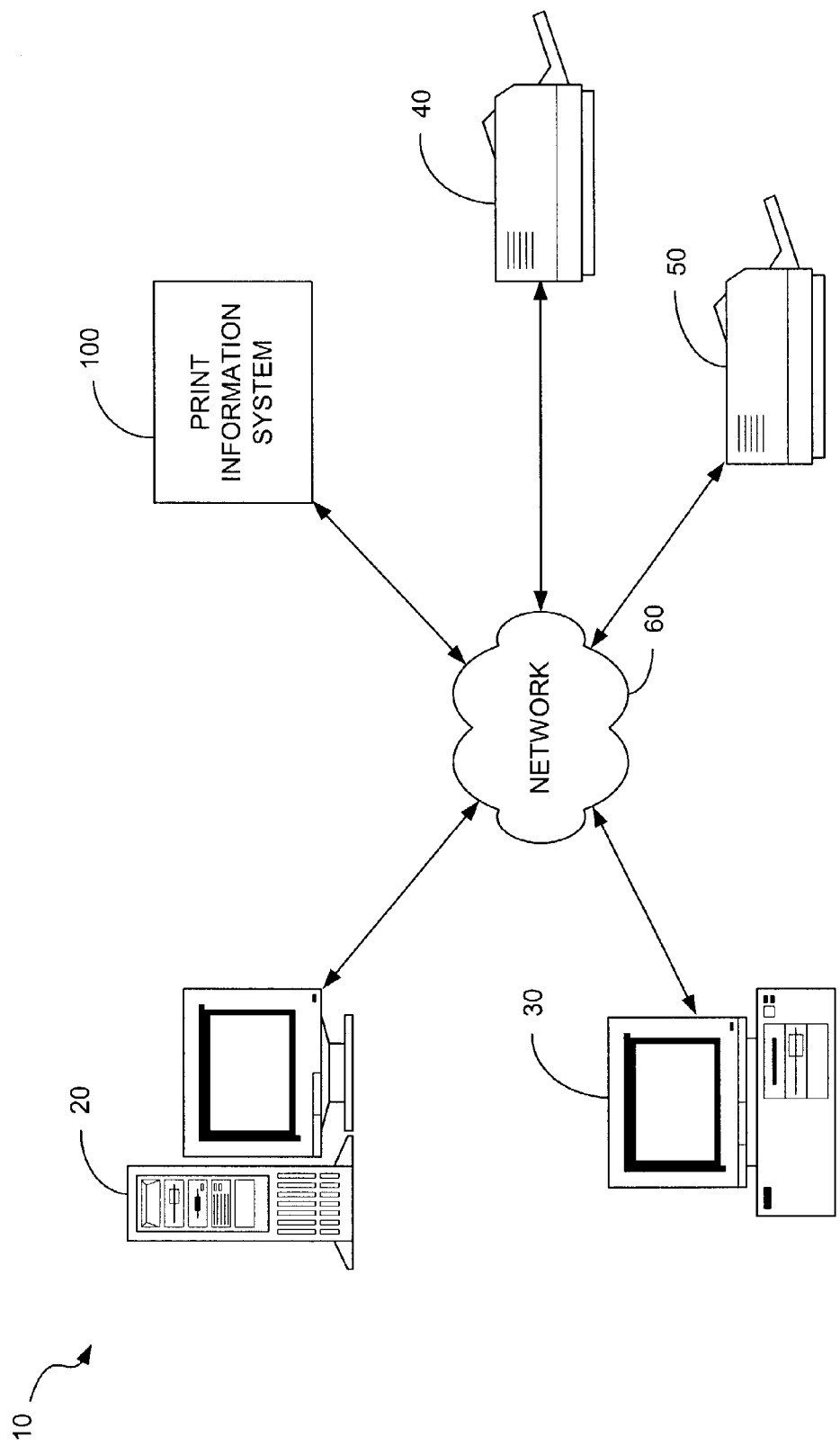
FIG. 1 is a schematic diagram depicting a representative embodiment of a print system of the present invention.

Referring now to the drawings, wherein like reference numerals indicate corresponding components throughout the several views, FIG. 1 is a schematic diagram depicting an embodiment of a print system 10 of the present invention. As shown in FIG. 1, print system 10 includes a print information system 100 as well as multiple network devices. More specifically, print system 10 includes a server 20, e.g., a network server, workstation 30, and printing devices 40 and 50, each of which can communicate with communication network 60. As used herein, the term "printing device" refers to a device(s) that is capable of converting information to hardcopy. Note, various numbers and types of network devices other than those shown in FIG. 1 could be included in a print system 10.

Network 60 may be a direct link and/or may be and/or include any type of communication network employing any network topology, transmission medium, or network protocol. For example, network 60 may be any public or private packet-switched or other data network, including the Internet, circuit-switched networks, such as the public switched telephone network (PSTN), wireless network, or any other desired communications infrastructure and/or combination of infrastructures.

Figure 2:
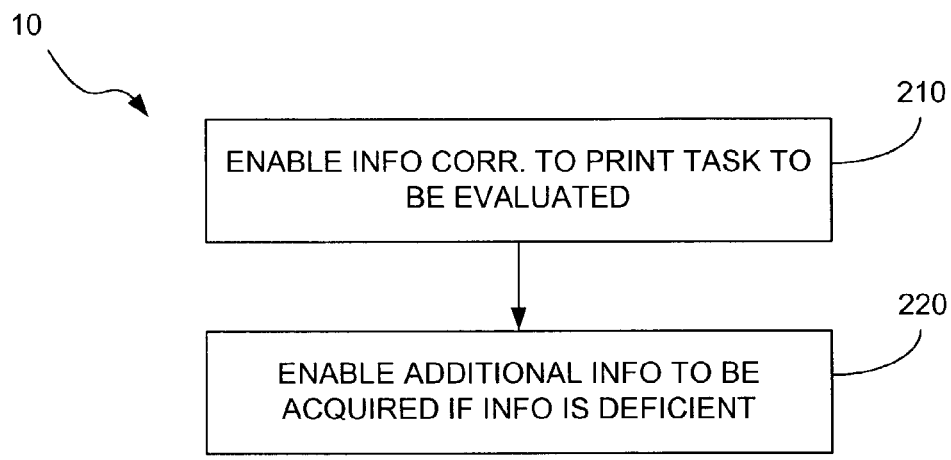
FIG. 2 is a flowchart depicting functionality of the embodiment of the print system of FIG. 1.

Functionality of the embodiment of the print system 10 will now be described with reference to the flowchart of FIG. 2. As depicted in FIG. 2, the print system or method 10 may be construed as beginning at block 210 where information corresponding to a print task is enable to be evaluated. In particular, the information corresponding to the print task is evaluated with reference to the printing device to which the print task is intended to be directed. In block 220, if it is determined that information corresponding to the print task is lacking, additional information is enabled to be acquired so that printing can be accomplished.

By way of example, the information corresponding to the print task may be lacking in that the information does not include all the information required for the printing device to be able to render the print task in a manner desired by the user. For instance, if the printing device to which the print task is directed is not able to access all of the font sets and/or algorithms associated with the print task, the printing device may not be able to render the print task substantially similar to the manner in which the information is rendered to the user via a display device. Thus, a what-you-see-is-what-you-get (WYSIWYG) rendering of the print task may not be able to be accomplished.

In order to enable a WYSIWYG rendering of the print task, the print system enables the additional information to be acquired by the printing device. In this regard, a print information system 100 (FIG. 1) of the invention can enable the additional information to be acquired, such as from another device. By way of example, information corresponding to the required font(s) can be provided by one or more devices, e.g., printing devices, of the network. By providing the printing device with the additional information, a font substitution can be avoided.

The information corresponding to the required font(s) can be provided to the printing device in various formats. Preferably, the information includes the raster bits (e.g., bitmapped data) associated with the font that is to be printed by the printing device. In such an embodiment, the device providing the information to the printing device typically would process that portion of the print task that can not be properly processed by the printing device, and then provides the processed information back to the printing device so that the print task can be properly processed. In this manner, even though the printing device to which the print task was directed may not possess the font set(s) required for properly printing the print task, the print system accommodates this inadequacy by enabling another device that is able to process at least a portion of the print task to process the information. Thus, the printing device should be able to provide a document corresponding to the print task that does not include a font substitution.

Figure 3:
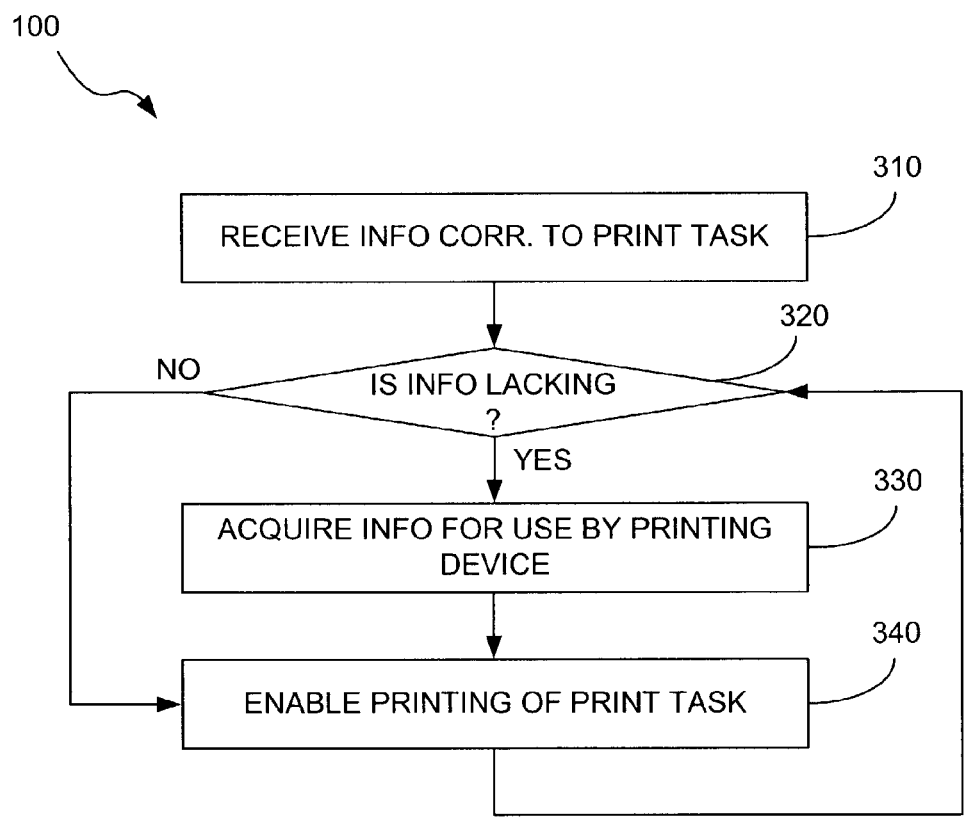
FIG. 3 is a flowchart depicting functionality of an embodiment of the print information system of FIG. 1.

As mentioned before, print systems of the invention use print information systems to perform various functions. In this regard, functionality of an embodiment of a print information system 100 will now be described with reference to the flowchart of FIG. 3. As shown in FIG. 3, the print information system or method 100 may be construed as beginning at block 310, where information corresponding to a print task is received. In block 320, a determination may be made as to whether the information is lacking in one or more respects. For instance, such a determination may include an evaluation as to whether the print task includes instructions to print a particular font, the font set(s) and/or algorithm(s) of which are not stored on and/or otherwise associated with the printing device to which the print task is directed. If it is determined that the information is lacking in some respect, the process may proceed to block 330, where the deficient information can be acquired. Thereafter, such as depicted in block 340, printing of the print task at the printing device can be enabled. Note, the process also may proceed to block 340 if it was determined that the information corresponding to the print task was not lacking (block 320).

Print information systems 100 can be implemented in software, firmware, hardware, or a combination thereof. When implemented in software, a print information system 100 can be a program(s) that is executable by a computer or processor-based device ("computer"), two examples of which are depicted schematically in FIG. 4. Note, in FIG. 4, each of computers 400 and 401 is used to implement a portion of print information system 100. More specifically, computer 400 is used to implement a print evaluation system 440 and computer 401 is used to implement a print assistance system 450. The print evaluation system 440 and print assistance system 450 will be described in greater detail later. Also note, for ease of description, only computer 400 will be described in detail.

Figure 4:
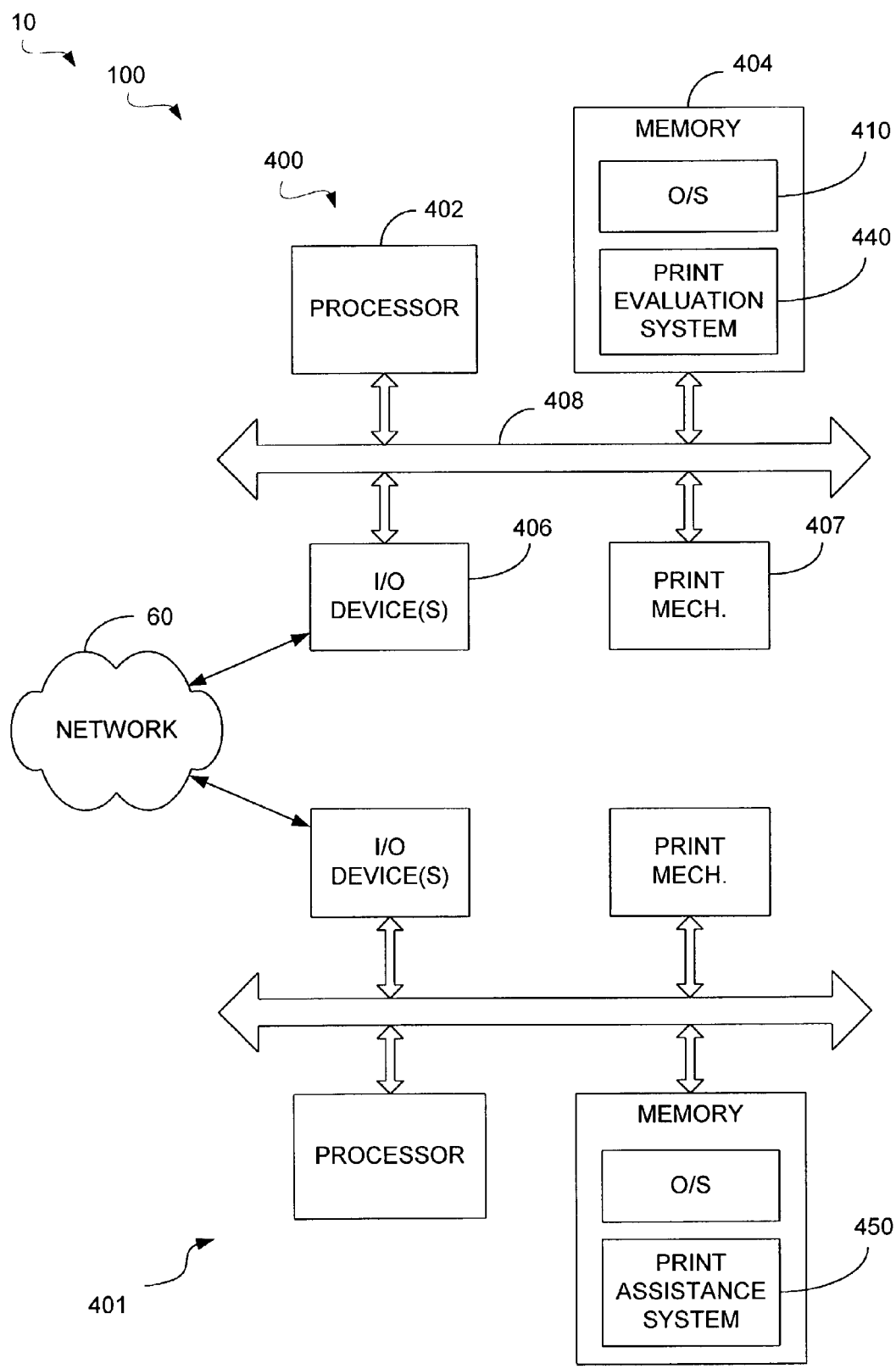
FIG. 4 is a schematic diagram depicting another embodiment of a print system of the present invention.

Generally, in terms of hardware architecture, computer 400 of FIG. 4 includes a processor 402, memory 404, and one or more input and/or output (I/O) devices 406 (or peripherals) that are communicatively coupled via a local interface 408. Local interface 408 can be, for example, one or more buses or other wired or wireless connections, as is known in the art. Local interface 408 can include additional elements, which are omitted for ease of description. These additional elements can be controllers, buffers (caches), drivers, repeaters, and/or receivers, for example. Further, the local interface may include address, control, and/or data connections to enable appropriate communications among the components of computer 400. Note, computer 400 can be configured as a printing device.

Processor 402 can be a hardware device configured to execute software that can be stored in memory 404. Processor 402 can be any custom made or commercially available processor, a central processing unit (CPU) or an auxiliary processor among several processors. Additionally, the processor can be a semiconductor-based microprocessor (in the form of a microchip), for example.

Memory 404 can include any combination of volatile memory elements (e.g., random access memory (RAM, such as DRAM, SRAM, etc.)) and/or nonvolatile memory elements (e.g., ROM, hard drive, tape, CDROM, etc.). Moreover, memory 404 can incorporate electronic, magnetic, optical, and/or other types of storage media. Note that memory 404 can have a distributed architecture, where various components are situated remote from one another, but can be accessed by processor 402.

The software in memory 404 can include one or more separate programs, each of which comprises an ordered listing of executable instructions for implementing logical functions. The software in the memory 404 includes print evaluation system 440 and a suitable operating system (O/S) 410. The operating system 410 controls the execution of other computer programs, such as print evaluation system 440. Operating system 410 also can provide scheduling, input-output control, file and data management, memory management, and communication control and related services.

The I/O device(s) 406 can include input devices, such as a keypad, for example. I/O device(s) 406 also can include output devices, such as a display device and/or a print mechanism 407, for example. I/O device(s) 406 may further include devices that are configured to communicate both inputs and outputs, such as a network communication port, for example.

When the computer 400 is in operation, processor 402 is configured to execute software stored within the memory 404, communicate data to and from the memory 404, and generally control operations of the computer 400. Print evaluation system 440 and the O/S 410, in whole or in part, are read by the processor 402, perhaps buffered within processor 402, and then executed.

When print evaluation system 440 is implemented in software, it should be noted that the remote print system can be stored on any computer-readable medium for use by or in connection with any computer-related-system or method. In the context of this document, a computer-readable medium is an electronic, magnetic, optical, or other physical device or means that can contain or store a computer program for use by or in connection with a computer-related system or method. Print evaluation system 440 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As used herein, a "computer-readable medium" can be any means that can store, communicate, propagate or transport a program for use by or in connection with an instruction execution system, apparatus, or device. Thus, a computer readable medium can be, for example but not limited to, an electronic, magnetic, optical, electromagnetic, infrared, or semiconductor system, apparatus, device, or propagation medium. More specific examples (a nonexhaustive list) of a computer-readable medium include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program could be electronically captured, via optical scanning of the paper or other medium, then compiled, interpreted or otherwise processed in a suitable manner, if necessary, and then stored in a computer memory.

When implemented in hardware, print evaluation system 440 can be implemented with any or a combination of various technologies. By way of example, the following technologies, which are each well known in the art, can be used: a discrete logic circuit(s) having logic gates for implementing logic functions upon data signals, an application specific integrated circuit (ASIC) having appropriate combinational logic gates, a programmable gate array(s) (PGA), and a field programmable gate array (FPGA).

Reference will now be made to the flowchart of FIG. 5, which depicts the functionality of a representative embodiment of a print evaluation system 440. In this regard, each block of the flowchart represents a module segment or portion of code that comprises one or more executable instructions, or logic for implementing the specified logical function(s). It should also be noted that in some alternative implementations the functions noted in various blocks of FIG. 5, or any other of the accompanying flowcharts, may occur out of the order in which they are depicted. For example, two blocks shown in succession in FIG. 5 may, in fact, be executed substantially concurrently. In other embodiments, the blocks may sometimes be executed in the reverse order depending upon the functionality involved.

Figure 5:
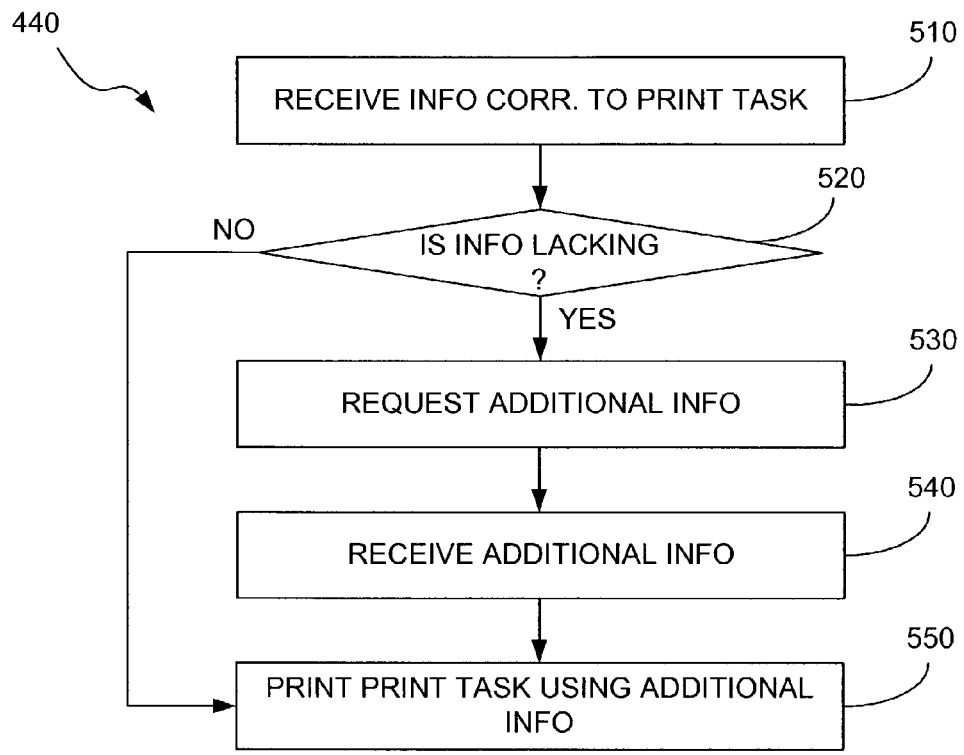
FIG. 5 is a flowchart depicting functionality of an embodiment of the print evaluation system of FIG. 4.

As shown in FIG. 5, the print evaluation system or method 440 may be construed as beginning at block 510, where information corresponding to a print task is received. In particular, the information can be received by the printing device to which the print task is directed. In block 520, a determination may be made as to whether information, i.e., information that will be used by the printing device for processing the print task, is lacking. If it is determined that information is lacking, the process may proceed to block 530, where a request for additional information is facilitated. For example, the request could be provided to one or more devices, such as via a network. Note, the additional information would be that required to correct the deficiency of the information previously received (the information received in block 510).

In block 540, the additional information is received. Thereafter, such as depicted in block 550, the print task can be printed. Note, print evaluation system or method 440 also can proceed to block 550 if it was previously determined in block 520 that information corresponding to the print task was not lacking.

Functionality of a representative embodiment of print assistance system 450 will now be made with reference to the flowchart of FIG. 6. Note, print assistance system 450 can be implemented by a device other than the printing device to which a print task is directed for printing. In some embodiments, the device could be another printing device.

Figure 6:
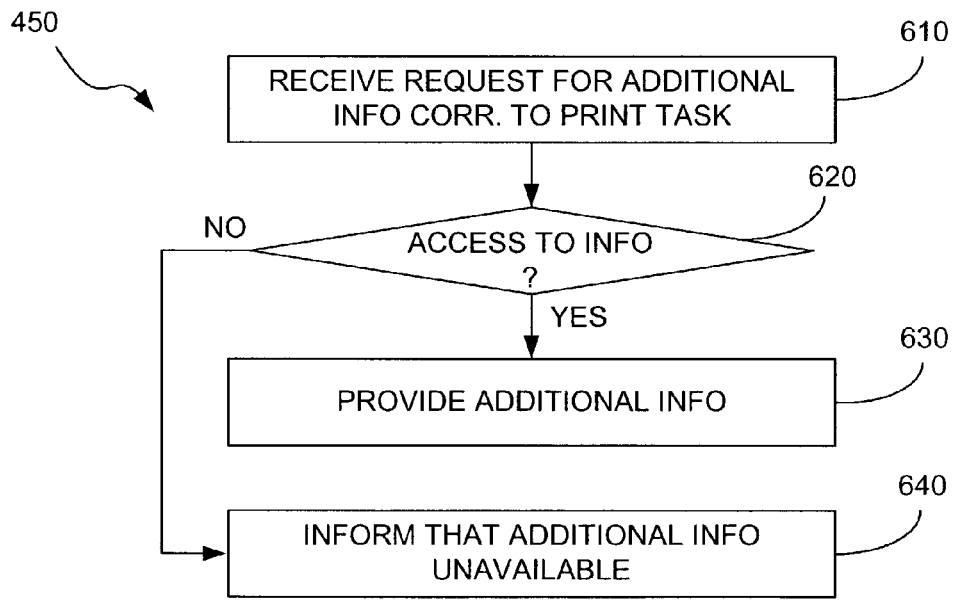
FIG. 6 is a flowchart depicting functionality of an embodiment of the print assistance system of FIG. 4.

As shown in FIG. 6, the print assistance system or method 450 may be construed as beginning at block 610, where a request for additional information is received. Typically, the request is received from the printing device that provided the request; however, as will be described later, such a request could be provided by another device. In block 620, a determination is made as to whether the requested additional information can be accessed. If it is determined that the information can be accessed, the process may proceed to block 630, where the information is accessed and then provided. In particular, the additional information can be provided to the printing device and/or other device that requested the additional information. If, however, it is determined that the additional information is not accessible, the process may proceed to block 640, where an indication can be provided to the requesting device, e.g., the printing device, relating to the inaccessibility of the information.

Assuming that the additional information required by a printing device relates to a font that is not currently enabled by the printing device, such additional information could be provided to the printing device in various formats. For example, the additional information could include raster bits associated with the desired font. In such an example, a printing device to which the print task was not directed could be prompted to generate the raster bits using a font set(s) and/or algorithm(s) associated with the requested font. Once generated, the raster bits could then be provided to the printing device that requires that information. In this manner, provided that one device of a network possesses the ability to process at least a portion of a print task, processing associated with the print task that may not be able to be performed by the printing device to which the print task is directed may be accomplished by the other device. Once processed, information suitable for use by the printing device, e.g., raster bits, can be provided to the printing device for use.

In some embodiments, a device other than the device to which the print task is directed can be involved with evaluating the print task and/or determining whether the printing device has access to the information required for rendering the requested document. By way of example, one or more devices intermediately disposed in the data stream between the user and the printing device could be used. For instance, a network or print server could be used. In such an embodiment, the server could determine that the printing device to which a print task is directed lacks the necessary information for properly rendering a document, and can then attempt to acquire the additional information. Once acquired, the server could route the additional information to the printing device. For instance, the additional information could be acquired and then provided to the printing device before, during and/or after receipt by the printing device of the print task.

Figure 7:
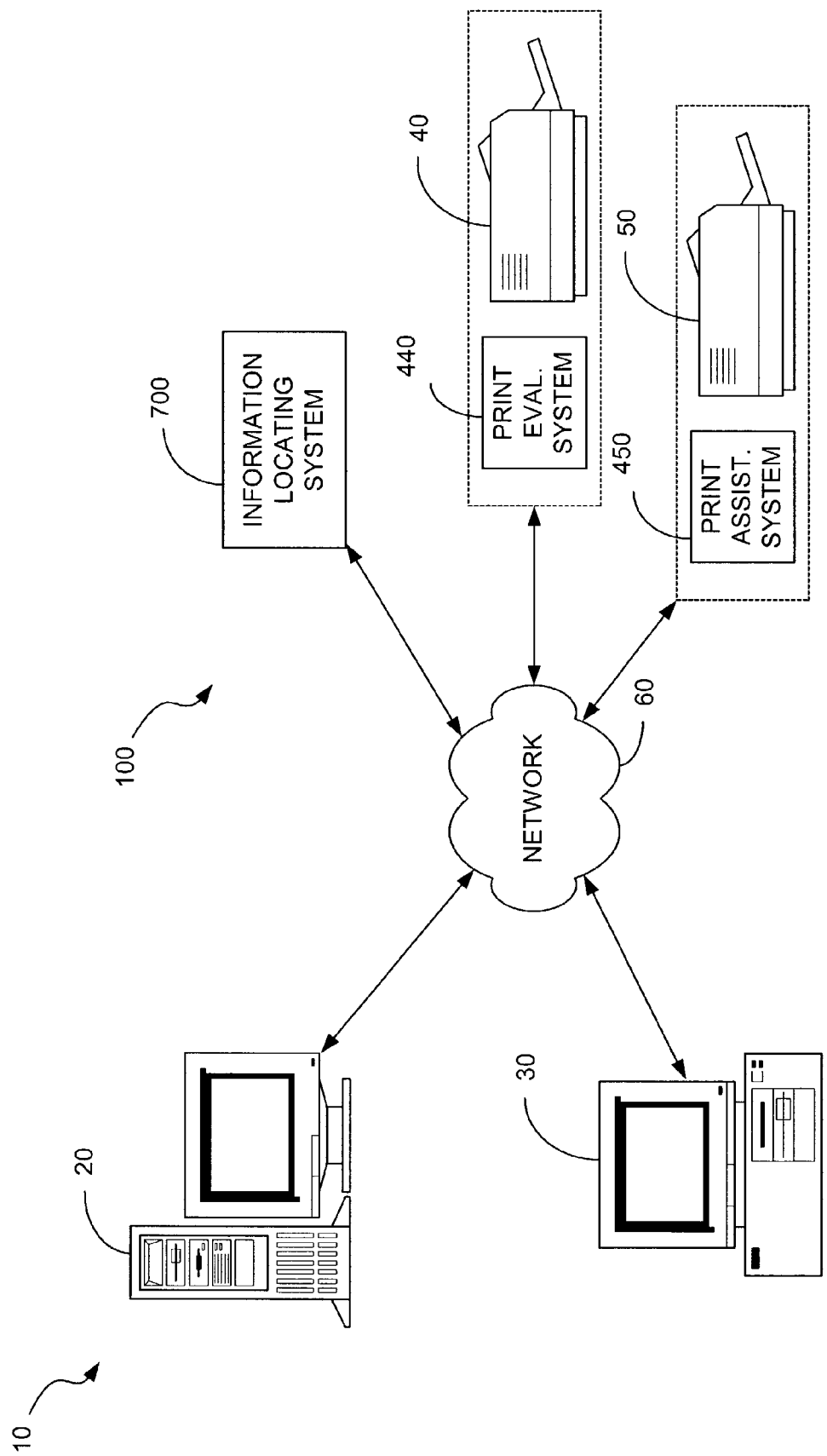
FIG. 7 is a schematic diagram depicting another embodiment of a print system of the present invention.

A representative embodiment of a print system 10 that can use an intermediate device to evaluate the print task and/or locate information required for rendering the requested document is depicted schematically in FIG. 7. As shown in FIG. 7, print system 10 uses an information locating system 700 that communicates with network 60. Much like the print information systems described before, information locating systems 700 can be implemented in software, firmware, hardware, or a combination thereof. Functionality of an embodiment of information locating system 700 will now be described with reference to the flowchart of FIG. 8.

Figure 8:
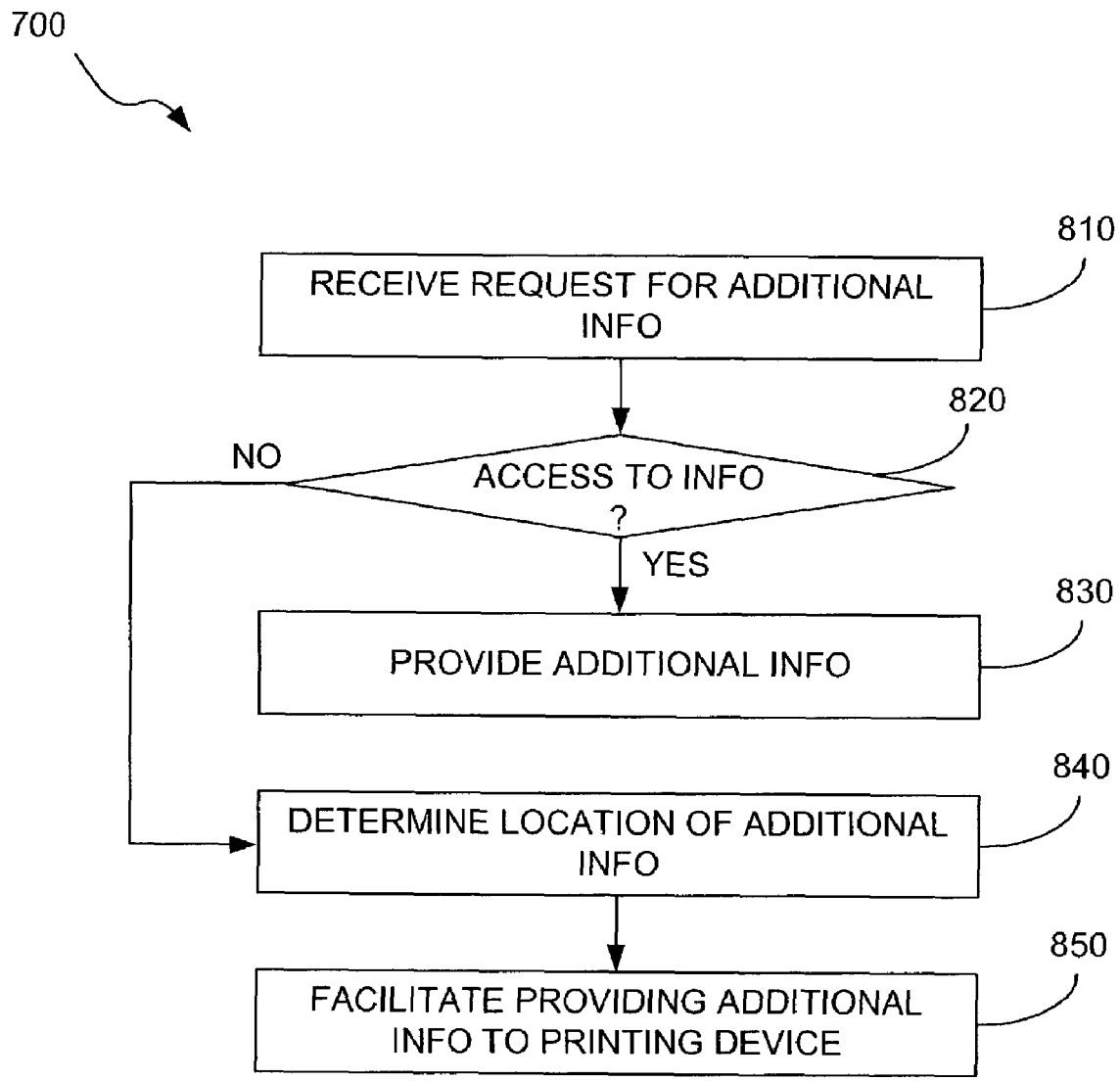
FIG. 8 is a flowchart depicting functionality of an embodiment of the print locating system of FIG. 7.

As shown in FIG. 8, the information locating system or method 700 may be construed as beginning at block 810, where a request for additional information is received. In block 820, a determination may be made as to the location of the requested additional information. By way of example, if the information locating system determines that the additional information is located at printing device 50, which is associated with a print assistance system 450, the process proceeds to block 830 where the information is provided. Otherwise, the process proceeds to block 840, where the location of additional information is determined. Then, in block 840, the additional information can be acquired from the determined location, such as by requesting the additional information from the location and receiving the information in response. Specifically, the additional information can be provided to the printing device to which the print task is directed.

Note, in some embodiments, when the location of the requested information is determined, the request can be forwarded to the device associated with the information. In response to the request provided by the information locating system, the device having access to the information can then provide the additional information to printing device to which the print task is directed, thus, bypassing the information locating system.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated.

The invention claimed is:

1. A method for printing comprising:
    enabling information corresponding to a print task to be evaluated; and
    if it is determined that a printing device to which the print task is directed is unable to process the print task without performing a font substitution, enabling additional information to be acquired by requesting the additional information from another printing device communicatively coupled to the printing device Via a network such that the printing device, by using the additional information, is able to process the print task without performing a font substitution wherein the additional information requested includes a request for raster bits associated with a font corresponding to a font set to which the other printing device has access.

2. The method of claim 1, wherein enabling information corresponding to a print task to be evaluated comprises:
    receiving the information corresponding to the print task.

3. The method of claim 1, wherein enabling additional information to be acquired comprises:
    requesting the additional information from another device.

4. A print system comprising:
    a print information system configured to evaluate information corresponding to a print task and acquire additional information such that, if it is determined that a first printing device to which the print task is directed is unable to process the print task without performing a font substitution, the print information system enables the additional information to be acquired, thereby enabling the first printing device, by using the additional information, to process the print task without performing a font substitution,
    the print information system comprising:
        a print evaluation system and a print assistance system, the print evaluation system being configured to evaluate the information corresponding to the print task and acquire the additional information, the print assistance system being configured to receive a request for additional information and provide the additional information in response to the request the first printing device within which the print evaluation system is implemented; and, a second printing device within which the print assistance system is implemented.

5. The print system of claim 4, wherein the request for additional information includes a request for raster bits associated with a font; and wherein the print assistance system is configured to produce the raster bits associated with the font, and provide the raster bits for use by the first printing device to which the print task is directed.

6. The print system of claim 4, wherein the print information system includes an information locating system, the information locating system being configured to:

determine whether the first printing device to which a print task is directed is able to process the print task without performing a font substitution;

determine the location of additional information for enabling the first printing device to process the print task without performing a font substitution; and enable the additional information to be provided to the first printing device.

7. The print system of claim 6, wherein the information locating system is configured to request the additional information from a device associated with the additional information, receive the additional information, and provide the additional information to the first printing device.

8. The print system of claim 4, wherein the information locating system is configured to request the additional information from the second printing device associated with the additional information, and enable the second printing device to provide the additional information to the first printing device.

9. A print information system stored on a computer-readable medium, the print information system comprising:

first logic configured to evaluate information corresponding to a print task;

second logic configured to acquire additional information such that, if it is determined that a first printing device to which the print task is directed is unable to process the print task without performing a font substitution, the print information system enables the additional information to be acquired so the first printing device, by using the additional information, is able to process the print task without performing a font substitution;

the first printing device within which the first and the second logic are implemented; and, a second printing device from which the additional information is acquired by the second logic.

10. A print information system stored on a computer-readable medium, the print information system comprising:

logic configured to receive a request for additional information, the additional information being adapted to enable a first printing device to process a print task without performing a font substitution, the logic implemented within the first printing device; and logic configured to provide the additional information in response to the request, the logic implemented within a second printing device.

11. The print information system of claim 10, wherein the request for additional information includes a request for raster bits associated with a font; and wherein the print information system includes:

logic configured to produce the raster bits associated with the font; and logic configured to provide the raster bits for use by the first printing device to which the print task is directed.

12. A print information system stored on a computer-readable medium, the print information system comprising:

logic configured to determine whether a first printing device to which a print task is directed is able to process the print task without performing a font substitution, the logic implemented within the first printing device;

logic configured to determine the location of additional information for enabling the first printing device to process the print task without performing a font substitution, the logic implemented within the first printing device; and logic configured to enable the additional information to be provided to the first printing device, the logic implemented within a second printing device.

13. The print information system of claim 12, further comprising:

logic configured to request the additional information from a device associated with the additional information;

logic configured to receive the additional information; and logic configured to provide the additional information to the first printing device.

14. The print information system of claim 12, further comprising:

logic configured to request the additional information from a device associated with the additional information; and logic configured to enable the device to provide the additional information to the first printing device.

15. A print system comprising:

means for enabling information corresponding to a print task to be evaluated; and means for enabling additional information to be acquired such that, if it is determined that a first printing device to which the print task is directed is unable to process the print task without performing a font substitution, the printing device is able to process the print task without performing a font substitution by using the additional information, the means implemented within the first printing device, the additional information acquired from a second printing device.

16. The print system of claim 15, further comprising:

means for receiving the information corresponding to the print task.

17. The print system of claim 15, further comprising:

means for requesting the additional information.

* * * * *

UNITED STATES PATENT AND TRADEMARK OFFICE
CERTIFICATE OF CORRECTION

PATENT NO. : 7,199,894 B2 Page 1 of 1
APPLICATION NO. : 10/282681
DATED : April 3, 2007
INVENTOR(S) : Samuel M. Lester et al.

It is certified that error appears in the above-identified patent and that said Letters Patent is hereby corrected as shown below:

In column 8, line 40, in Claim 1, delete "Via" and insert -- via --, therefor.

Signed and Sealed this

Nineteenth Day of May, 2009

JOHN DOLL
*Acting Director of the United States Patent and Trademark Office*